INVENTORS
WALTER R. SOOY,
DAVID P. BORTFELD,
RICHARD E. BRADBURY,
BY John Holtrichter J.

ATTORNEY even though the increase in scattering loss due to increased path length in a thicker cell may be more than offset by increased absorption in the liquid.

3,560,077

VARIABLE TRANSMISSION PASSIVE Q-SWITCH

Walter R. Sooy, Manhattan Beach, Calif., David P. Bortfeld, Spreitenbach, Switzerland, and Richard E. Bradbury, Los Angeles, Calif., assignors to Hughes Aircraft Company, Culver City, Calif., a corporation of Delaware Filed Feb. 19, 1968, Ser. No. 706,385
Int. Cl. G01n 1/10; G02f 1/36
U.S. Cl. 350—160      2 Claims

ABSTRACT OF THE DISCLOSURE

This is a passive Q-switch that may be adjusted to provide variable transmission characteristics. In its most basic form, it may consist of a cell with spaced and parallel optically flat windows that contains a solution of a passive Q-switch material such as cryptocyanine dissolved in isopropyl alcohol. The transmission or absorption of the switch is varied by changing the thickness of the absorbing liquid layer between the windows.

---

The problem of irregular pulsations in a laser output has caused great concern to those involved in the laser field since the time of the first successfully operated laser in the summer of 1960 by Dr. T. H. Maiman. This is especially true in the area of laser rangefinding and communications, where the timing and control of the intensity envelope are critical.

A method of control of the laser output to eliminate these objectionable pulsations was first proposed by Dr. R. W. Hellwarth in 1961 and published in Advances in Quantum Electronics (Columbia University Press, New York, pp. 334–341). What has now become known as giant pulses were produced by Dr. Hellwarth using a ruby laser in which the cavity resonances was controlled in such a way that oscillation was inhibited until after a high inversion ratio was obtained. Then, the inhibition was suddenly switched off and the giant pulse produced. The control devices used in these and subsequent experiments were electro-optical or rotating prism devices that artificially impaired the optical path in a laser and consequentially were referred to as Q-spoilers of Q-switches.

A more recent development in the Q-switching art has been the use of certain bleachable absorbers in the laser. At first such a switch consisted of a thin film of blue dye on a glass substrate that was placed in a laser resonator so that it contributed a loss to the system to inhibit oscillation. When the laser material was excited to a high population inversion, the gain of the system overcame the loss introduced by the passive material and oscillation commenced to render the film virtually transparent but thereafter useless because a permanent hole was burned in the dye film.

Later, passive Q-switches were constructed from organic dye solutions that would recover after bleaching and were thus reuseable. This was a great advantage over the non-reversible type passive material formerly used but still there remained a problem of fixed transmission or absorption of a particular passive material. For example, the pulse width and highth of a pulse emitted by a laser using a passive Q-switch is a function of (a) the transmission of the switch, (b) the gain in the active laser material and (c) the output reflectivity of the laser cavity. In ranging type laser systems, the output reflectivity is fixed, but the gain of the active laser material is a function of temperature. Thus, the output power will be temperature sensitive if the transmission or absorption of the passive filter is fixed. Therefore, it should be clear that a variable transmission passive Q-switch would be very useful and constitute a significant advance in the art.

It is therefore an object of the present invention to provide an improved passive Q-switch.

It is another object of the invention to provide a variable transmission passive Q-switch that may be adjusted while it is in a laser cavity without disturbing cavity alignment.

It is still another object of the invention to provide a variable transmission passive Q-switch that is relatively simple to construct and easy to adjust.

These and other objects of the invention are obtained, according to one embodiment of the invention, wherein a solution of a passive Q-switch material is disposed in a cell having spaced and parallel optically flat windows, and wherein the transmission through the cell is adjusted by changing the thickness of the solution of passive Q-switch material between the optically flat windows.

The invention and specific embodiments thereof will be described hereinafter by way of example and with reference to the accompanying drawings wherein like reference numerals refer to like elements or parts and in which.

Figure 1:
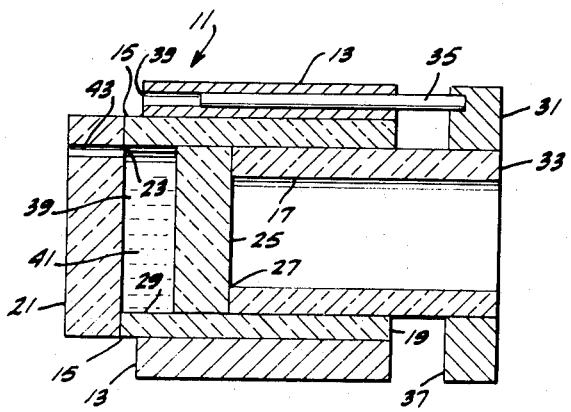
FIG. 1 is a cross-sectional view of a variable transmission passive Q-switch according to one embodiment of the invention.
Figure 2:
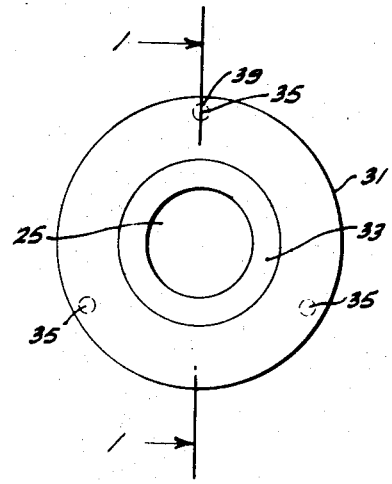
FIG. 2 is an end view of the device shown in FIG. 1.

With reference now to the drawing and more particularly FIGS. 1 and 2, there is shown a cell 11 comprising a cylindrical casing 13 holding an outer cylinder member 15, an inner cylindrical plunger 17 slidably mounted in a first end 19 of and within the outer cylinder member 15, a fixed optically flat or window 21 mounted on and closing a second end 23 of the outer cylinder member 15, and a movable optical flat 25 mounted on and closing an inner end 27 of the inner cylindrical plunger 17 inside the outer cylinder member 15.

The outer cylinder member 15 and the inner cylindrical plunger 17 may be fabricated from a material such as glass and the slidable surface 29 between them may preferably be ground to provide a precision liquid-tight fit. A plunger holder collar 31 is mounted on an outer end 33 of the inner cylindrical plunger 17 and is guided and prevented from allowing rotation of the inner cylindrical plunger 17 by guide rods 35 attached to an inner surface 37 of the collar 31 and slidably held in guide holes 39 bored in the cylindrical casing 13.

The fixed and movable optical flats 21 and 25 may be fused or cemented to the outer cylinder member 15 and the inner cylindrical plunger 17, respectively, which may both be precision ground glass tubes of the type used in hypodermics or vacuum systems. As stated before, the fit between the slidable elements is such that liquid will not leak. Also, the tight fit and the guide rods 35 assure that the optical alignment between the optical flats or windows will not change when the movable flat 25 is moved.

A cavity 39 between the windows of the cell 11 is kept filled by a liquid Q-switch material 41 held in a reservoir (not shown) coupled through a hole 43 in the fixed flat or window 21, thus allowing the movable flat 25 to be moved very close to the fixed flat 21.

The liquid Q-switch material may be cryptocyanine (kryptocyanine; 1,1' - diethyl-4,4'-carbocyanine iodide) dissolved in a solvent such as isopropyl alcohol. The material has shown that it can easily withstand the high power generated by a laser beam without suffering dielectric breakdown and that it can be used in a passive Q-switch such as shown in FIG. 1 where its thickness is reduced to less than one millimeter and still achieve Q-switch action. The use of thin cells is preferable because of decreased turbulence in the liquid that may cause scattering losses.

Once filled with an appropriate Q-switch material, the transmission of the cell 11 may be varied by moving the inner cylindrical plunger 17 with relation to the outer cylinder member 15. The thicker the cavity 39 becomes, the less will be the transmission.

Figure 3:
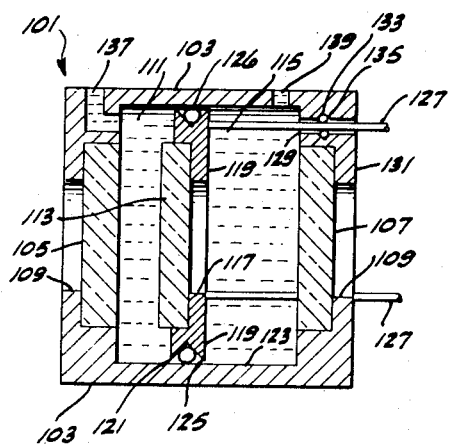
FIG. 3 is a cross-sectional view of another embodiment of the invention.
Figure 4:
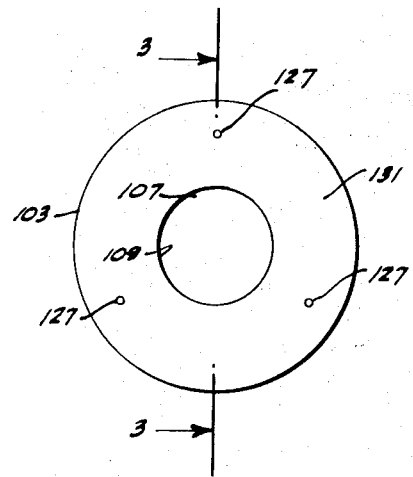
FIG. 4 is an end view of the device shown in FIG. 3.

A second embodiment of the invention is illustrated in FIGS. 3 and 4, where a cell 101 comprises an outer cylindrical casing 103 machined or cast from a metal such as aluminum or steel, a first optical flat or window 105 and a second optical flat or window 107, each mounted in and closing apertures 109 in the different ends of the casing 103.

Within the cell 101 there is located a first cavity 111 between the first windows 105 and an intermediate optical flat or window 113. A second cavity 115 is located between the intermediate window 113 and the second window 107. The intermediate window 113 is mounted across an aperture 117 in a movable ring 119. In order to provide a liquid tight, yet movable, fit between the circumferential surface 121 of the movable ring 119 and the inner surface 123 of the casing 103, there is disposed a depression or channel 125 in the circumferential surface 121 into which is disposed a sealing O-ring 126 of rubber or preferably polymer material. The intermediate window 113 is moved by means of guide rods 127 attached perpendicularly to the movable ring 119 and passing through holes 129 in an end portion 131 of the casing 103. The rods 127 protrude through the holes 129 and are sealed against leakage by the use of O-ring seals 133 carried by circular grooves 135 in the holes 129. Thus, it can be seen that the thickness of the first cavity 111 may be varied by pushing or pulling the rods 127 into or out of the holes 129.

The first cavity 111 is filled with a liquid Q-switch material comprising an absorbing material dissolved in a liquid solvent and the second cavity 115 is filled with the same liquid solvent but without the absorbing material. The first and second cavities 111 and 115 are each connected to separate reservoirs (not shown) through first and second cavity apertures 137 and 139, respectively, in the casing 103 in order to keep these cavities filled with liquid or to accept excess liquid as the intermediate window 113 is moved back and forth.

The advantage of this embodiment is that the outer windows are not moved so that there is less effect by the cell on the optical alignment of the laser in which it is used when the absorption is varied through the cell. For best results, the index of refraction of the solvent should closely match that of the movable intermediate window 113. Thus, slight cocking of this movable element while moving will not appreciably change the direction of a light beam passing through it.

In much the same manner as described in the first embodiment, the transmission through the cell 101 is varied by simply moving the intermediate window 113. The thicker the first cavity 111 becomes, the more absorption is presented and the less will be the transmission.

Thus, it can be seen that the basic aspects of the invention consist of a cell having optically flat windows and containing a solution of a passive Q-switch material and in which the transmission is varied by changing the thickness of the absorbing liquid layer between the windows. By the use of this configuration, the transmission of the cell may be varied while it is in a laser cavity without disturbing the cavity alignment. Also, the optical path length of the liquid material may be maintained of the order of a few millimeters or less which significantly improves performance.

Although specific embodiments of the invention have been described in detail, other organizations of the embodiments shown may be made within the spirit and scope of the invention. It should also be understood that other materials than those specifically described having the same or similar characteristics may be substituted.

What is claimed is:

1. A variable transmission passive Q-switch, comprising:
    an outer cylindrical cell housing;
    an optically flat outer window disposed at and closing each end of said outer cell housing to form a liquid container, said windows having a substantially parallel relationship;
    an annular movable ring member slidably disposed within said outer cell housing between said outer windows and having a liquid tight seal between said outer cell housing and said annular ring member;
    an intermediate optically flat window disposed at and closing the aperture in said annular ring member so as to provide a first and second inversely related variable thickness cells within said outer cell housing, said intermediate window having a substantially parallel relationship with said outer windows;
    means coupled to said annular ring member for changing the position thereof with relation to said outer windows;
    means coupled to said first cell for maintaining said first cell full of a solution of a passive Q-switch material having a predetermined index of refraction; and
    means coupled to said second cell for maintaining said second cell full of an optically transparent solution exhibiting no passive Q-switch characteristics and having an index of refraction substantially similar to that of said Q-switch material.

2. A variable transmission passive Q-switch according to claim 1, wherein said solution of a passive Q-switch material comprises a passive Q-switch material and a solvent therefrom, and wherein said optically transparent solution is said solvent.

References Cited

UNITED STATES PATENTS

| | | | |
|---|---|---|---|
| 2,690,695 | 10/1954 | Coates | 356—246 |
| 3,424,515 | 1/1969 | Risk | 350—267 |

OTHER REFERENCES

Kafalas et al., Photosensitive Liquid used as a Nondestructive Passive Q-switch in a Ruby Laser. J. App. Phys., vol. 35, No. 8 (August 1964), pp. 2349 and 2350.

WILLIAM L. SIKES, Primary Examiner

U.S. Cl. X.R.

356—246